Nov. 25, 1941.     J. KUSHNER     2,263,735
GAME APPARATUS
Filed Nov. 27, 1940
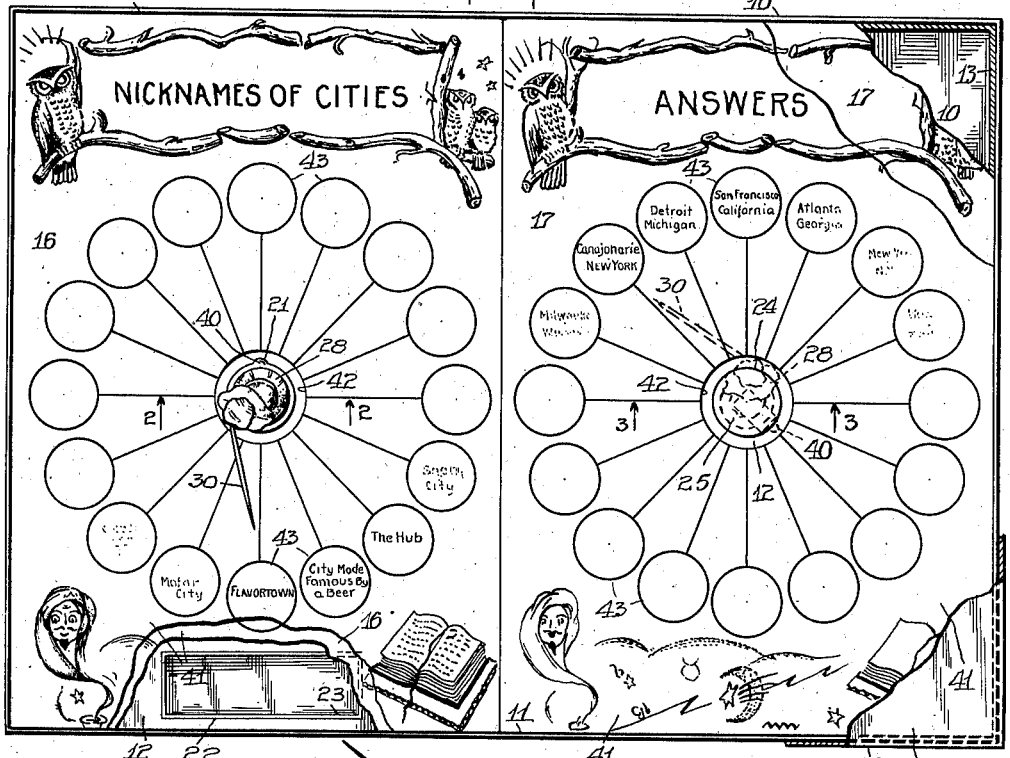
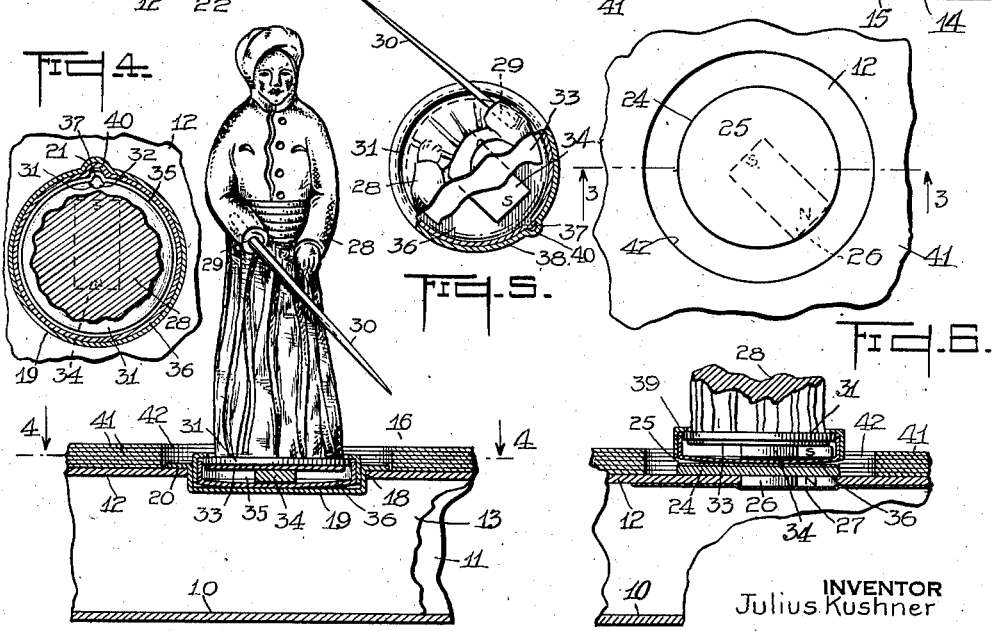
INVENTOR
Julius Kushner
BY
his ATTORNEY.

Patented Nov. 25, 1941

2,263,735

UNITED STATES PATENT OFFICE 2,263,735

GAME APPARATUS

Julius Kushner, Brooklyn, N. Y.

Application November 27, 1940, Serial No. 367,397

8 Claims. (Cl. 35—9)

My invention relates to improvements in game apparatus and more particularly to an apparatus which is designed for playing what is known as a question and answer game, and in which the players are not only amused and mystified to a certain extent, but receive instructive information as well.

The primary object of the invention is to provide a game apparatus characteristic of the so-called popular question and answer contests, and embodying among other characteristics, means whereby a magnetically controlled indicator is adjusted to a selected position with respect to a question station in one portion of a game board and is thereafter transferred to an answer station in another portion of the game board having a fixed magnet, whereby the indicator is oscillated by magnetic attraction to a predetermined position on the answer station corresponding with and containing the correct answer to the question selected.

A further object of my invention is to provide a game apparatus of this character, wherein the question and answer stations are denoted on the opposite pages of a book containing a plurality of pages so as to bring the two playing pages into full view when the book is open at any set of questions and answers.

A still further object of this invention resides in the special construction of the indicator, embodying therein a convex base provided with a fixed magnet and an indicator proper adjustable with respect to the base and magnet and capable of being moved to point to the question on a board selected for receiving an answer.

With the above and other objects in view, the present invention consists of the novel features of construction, combination and arrangement of parts to be hereinafter more fully described and claimed, and illustratively exemplified in the accompanying drawing, in which:

Figure 1 is a plan view of the complete invention;

Figure 2 is a substantially longitudinal sectional view of a portion of the question station of the game board taken on line 2—2 of Figure 1, the indicating element being shown in front elevation;

Figure 3 is a substantially longitudinal sectional view of the portion of the answer station of the game board taken on line 3—3 of Figure 1;

Figure 4 is a substantially transverse sectional view of the indicator at the question station and taken on line 4—4 of Figure 2;

Figure 5 is a top plan view partly in transverse section of the indicator element in the position taken on the answer station; and Figure 6 is a top plan elevational view of a portion of the answer station.

In the preferred form of construction, the game apparatus comprises a rectangular box shaped container 10, having a bottom wall and upright side walls 11. A horizontal partition 12 is arranged within the container 10 and supported by depending side walls 13 which fit closely to the inner sides of the walls 11 and rest upon the bottom thereof. The container 10 is closed by a cover 14 having a top and sides 15 which fit over and embrace the sides 11.

The horizontal partition 12 is divided, by an imaginary line, coincident with its minor axis, into two so-called stations, namely, a question station 16 and answer station 17, the stations taken together forming a game board.

The center of question station 16 is provided with an opening 18 into which a metal cup or receptacle 19 is disposed. The cup is a circular member consisting of a bottom and side wall and flange 20, which rests upon the surface of the partition 12, as illustrated particularly in Figure 2. The wall and flange 20 of the cup are provided with an interior radially disposed notch 21. The notch is formed by pushing the material outwardly, the pushed out part being embedded into the wall of the opening 18 to prevent the cup from turning therein, as illustratively exemplified in Figure 4. The notch 21, in the present embodiment of the invention, is disposed on a radial line perpendicular to a common center line of the two stations; in other words, the notch may be referred to as being disposed at the top of the cup.

The question station 16 is further provided with a rectangular opening 22 disposed adjacent one side of partition 12 and adapted to accommodate a box 23 which rests upon the bottom of the container 10 and has its side and end walls projecting upwardly and through the opening 22. The box 23 is provided to store the indicator and other detached parts of the game device when not in use.

Referring now to the answer station 17, shown in Figures 1, 3 and 6, the center thereof is provided with a disc 24 consisting of cardboard and an upper layer of highly glazed paper 25. The disc 24 is pasted or otherwise adhered to the surface of the partition 12, and directly under the disc and embedded in the under side of the partition is a fixed bar magnet 26, the major axis thereof being disposed radially of the center of the disc 24 and at approximately 45 degrees in a clockwise direction below the common center line of the centers of the two stations 16 and 17. In the present instance, and for the sake of illustration, the north pole of the magnet 26 is at the outer end thereof and the south pole at the inner end. The magnet 26 is held securely in a fixed position by means of a strap 27 projecting over the under side of the magnet and adjacent surface of the underside of the partition 12 to which the strap is adhered.

The indicator used in the practical application of the present invention comprises an upright image 28 in the form of a man having an opening 29 in the outer end of one of his arms to receive a wand 30, which is a small pointed stick and which is directed downwardly and at an angle across the front of the image. The lower extremity of the image comprises a disc shaped base 31 having at the rear thereof a notch or other indication mark 32. The base 31 rests directly upon a brass disc 33 which in turn is rotatably supported upon the upper surface of a fixed bar magnet 34. The magnet is disposed diametrically of a cup shaped holder 35 having a slightly convex bottom 36 and upright side wall, which is preferably annular, and loosely embraces the base 31 of the image, as illustratively exemplified in Figures 2 to 4. The magnet 34 is permanently affixed to the inner surface of the bottom 36 in a position to bring the south pole end of the magnet closely adjacent the peripheral wall of the holder 35, and in order to indicate the position of the south pole of the magnet with respect to the side wall, the latter is provided with an outwardly projecting teat 37, at the point where the south pole end of the magnet is nearest to the wall. The disc 33 and cup holder 35 are held in position on the base 31 by means of a sleeve 38, which fits tightly about the upright annular wall of the holder 35, and which is provided with a bezel 39 at its upper end which projects inwardly over the outer peripheral margin of the base disc 31. At one point in the periphery of the sleeve 38, the latter is pressed outwardly to form a projection 40, which in the assembly of the indicator fits over the teat 37, and which in operation fits into the notch 21 of the receptacle 19. The purpose of this construction is to enable the image to be turned in the holder 35 and the wand or pointer to be adjusted to any radial position in the question station.

To enable the game to be used for a plurality of subjects or to include a greater number of questions and answers than may be practically accommodated in a single playing surface, I utilize a book which is fixed upon the upper surface of the partition 12 and which comprises a plurality of pages 41, and which, when in open position, brings a page of questions over the question station 16 and a page of answers to the questions over the answer station, as illustratively exemplified in Figure 1. The end pages 41 of the book are adhered to the surface of the partition 12 and the center of each page, whether it is a question or an answer page, is provided with an opening 42 which is substantially greater in diameter than that of either the cup receptacle 19 or the disc 24, and which allows the base of the image indicator to be inserted and removed from the receptacle 19 and then placed upon the disc 24. The superimposed pages 41 and alined openings 42 are shown particularly in Figures 2 and 3 of the drawing.

The particular arrangement of the questions and answers on the pages 41 is shown in Figure 1, and comprises a plurality of lines radiating from the peripheries of the openings 42, each line terminating at its outer end in a circle or box 43 containing a question or an answer.

In the present case, the image 28 is placed in the receptacle 19 so as to bring the projection 40 into the notch 21, and the image is turned about on the brass disc 33 in the sleeve 38 and holder 35 until the wand 30 is directed towards the circle 43 at the question station 16 containing the question selected for an answer. The image 28 is then removed from the receptacle 19 and question station and is placed upon the glazed surface 25 of the disc 24, so that the convex bottom 36 rests freely upon the flat surface 25. It will be recalled that the south pole end of the magnet 34 is adjacent the periphery of the holder 35 and at a point thereof coinciding with the projection 40, and therefore, when the image is placed at random upon the disc 24, the magnetic attraction set up in the magnets 34 and 26 will tend to draw the south pole end of the image magnet towards the north pole end of the fixed magnet 26 in the answer station, but due to the convex bottom 36 the least resistance offered to the magnetic pull is one which results in the image describing a turning movement while being held to the disc 24. The turning movement of the image will automatically continue until the south pole end of the magnet 34 is directly over the north pole end of the magnet 26, which in the present arrangement is at a point on a radial line substantially 45° in a clockwise direction below the common center line of the two stations 16 and 17. The wand 30 will always point to the circle in the answer station, which circle is removed from the said projection 40 the same number of degrees which separates the circle enclosing the question selected in the question station, from the fixed position of the notch 21. An example of the relative positions of the answers to the questions is illustrated in Figure 1, in which the question selected is in the circle 43 disposed at a point 180° from the notch 21. When the image is placed upon the disc 24 it will turn until the wand points to a circle 43 containing the answer in the answer station which is 180° from the north end pole of the magnet.

The game is played by removing the image 28 from the box 23 and inserting the wand 30 in the socket 29 in the arm. The entire box, and particularly the partition 12, must be placed upon a horizontal plane. The pages 41 are turned to any set of questions which are to be answered. The image 28 is placed in the cup 19 so as to bring the projection 40 into the notch 21. The image is then turned until the wand 30 points to the circle 43 containing the question to be answered. The image is thereafter lifted out of the cup 19 and placed upon the disc 24 in the answer station and, when released, will automatically turn until the wand 30 points to the circle 43 containing the correct answer. This operation may be repeated until all questions have been correctly answered.

Having described my invention and the manner in which the same operates, what I claim and desire to secure by Letters Patent is:

1. In a game device of the character described, the combination of a playing surface divided into corresponding stations containing certain indicia relating to a common subject, one station having a holder and the other a magnet, and a playing piece to be moved from one station to another, said playing piece having a base to be placed in said holder and held against rotary movement therein, an indicator element rotatably supported in said base, and a magnet fixed in the base, whereby when the playing piece is placed in the holder and the indicator element is turned in its base to point out the selected indicia at the station and is thereafter placed upon the other station containing the magnet, the attraction of the opposite magnetic poles of the two magnets will bring them together and the indicator element will turn about with the base and automatically point to subject matter common to that selected indicia of the first station.

2. In a game device of the character described, the combination of a horizontal playing surface divided into similar stations containing certain indicia relating to a common subject, one station having a holder provided with a radially disposed notch and the other station having a flat surface in the position corresponding to that occupied by the holder in the first station, a fixed magnet arranged below said flat surface of the second station, and a playing piece to be moved from one station to the other, said playing piece comprising a base having a projection to fit into the notch in the holder when the base is placed therein, a magnet fixed in said base, and an image supported in said base and capable of being turned therein and provided with a pointer, whereby the image and pointer may be turned in the stationary base in the holder to point to certain indicia on the first station and thereafter the playing piece may be removed from the first station and placed on the flat surface of the second station whereupon the opposite poles of the then adjacent magnets are attracted and the playing piece automatically turns about to allow the said poles to come together and the pointer to point out the indicia on the second station relating to the subject matter of the certain indicia selected in the first station.

3. A game device as claimed in claim 2, in which said flat surface of the second station is polished to facilitate the turning movement of the playing piece.

4. A game device as claimed in claim 2, in which the base of the playing piece is provided with a convex bottom to be supported on said flat surface whereby the turning movement of the playing piece under the magnetic attraction of the two magnets is facilitated.

5. A game device, comprising a game board having a bar magnet and a playing piece having a base provided with a bar magnet and an indicating element turnable in said base, whereby when the playing piece is placed upon the board over said first magnet the opposite poles of the two magnets will attract each other and the playing piece will rotate to a position where the opposite poles of the magnets are adjacent.

6. In a question and answer game of the character described, the combination of a playing surface divided into a station bearing indicia constituting questions arranged in a circle the center of which is provided with a holder and a second station bearing indicia constituting answers arranged in a circle the center of which contains a fixed magnet, and a playing piece having a base containing a magnet and being adapted to fit into the holder and be held against rotary movement therein, and an image holding a pointer rotatably mounted in said base, whereby movement of the image in its base to point to a certain question brings the magnet into an angular relation to the pointer so that when the playing piece is removed from the question station and placed upon the center containing the magnet of the answer station, the opposite poles of the two magnets are attracted and turn the piece about and bring the pointer to an answer which is the proper answer to the question selected.

7. A playing piece for a game device of the character described, consisting of a base comprising a cup shaped bottom provided with a downwardly directed convex bottom wall, a fixed magnet arranged diametrically inside said cup, a plate of non-electric conducting material loosely supported on said magnet, an image having a flanged base portion resting on said place and a pointer projecting radially of the image, and a sleeve embracing the side of the cup and being turned over on its upper end to form a bezel bearing upon the flange of the base portion of the image to hold the same in the first mentioned base.

8. A playing piece as claimed in claim 7, in which the said sleeve is provided with an exterior radial projection to be engaged and held while the image is being turned to change the angle of the said magnet with respect to the direction of the pointer.

JULIUS KUSHNER.